Patented May 18, 1937

2,080,497

UNITED STATES PATENT OFFICE 2,080,497

PROCESS FOR THE MANUFACTURE OF PERFUME BASES

Walter Christian Meuly, New Brunswick, N. J., assignor to E. I. du Pont de Nemours & Company, Wilmington, Del., a corporation of Delaware No Drawing. Application September 6, 1935, Serial No. 39,442

11 Claims. (Cl. 260—132)

This invention relates to new methods for the preparation of perfume bases and more particularly to a new and improved process for the isomerization of pseudo-ionones, such as $\psi$-ionone and $\psi$-methyl-ionone.

The manufacture of ionones comprises the well known steps of first condensing the aliphatic aldehyde citral with the lowest members of the series of saturated aliphatic ketones; namely, acetone or methyl-ethyl-ketone to produce, respectively, pseudo-ionone and pseudo methyl-ionone; and of subsequently subjecting these pseudo-ionones to isomerization by heating with an acid. This operation converts the aliphatic pseudo-ionones into alicylic ring compounds by molecular rearrangement.

As acids for the above purpose in the art have been suggested phosphoric, sulfuric and concentrated formic. Some salts of acid reaction have also been suggested. (U. S. Patent 1,996,116.)

These reagents are not all alike in their action, some leading predominantly to the $\alpha$-isomers of ionone, and others leading predominantly to the $\beta$-isomers. It will be noted that $\psi$-ionone is capable of ring closing to give two isomeric forms, known as $\alpha$-ionone and $\beta$-ionone. $\psi$-methyl-ionone is capable of giving 4 isomers; these have been distinguished in the art as $\alpha$-methyl-ionone $a$, $\alpha$-methyl-ionone $b$, $\beta$-methyl-ionone $a$ and $\beta$-methyl-ionone $b$. (German Patent 150,827.)

The various isomerizing agents mentioned differ among themselves also in efficiency, yields, and methods of recovery. In particular, where concentrated formic acid has been used in the art, the perfume intermediate, which consists predominantly of the $\alpha$-isomer, was isolated by diluting the mass with water, to separate the oily ionone compound (German Patent No. 133,563). Such a process, however, could not be employed on a practical scale unless the formic acid were recovered. This required therefore the auxiliary process of concentrating the aqueous acid layer from the diluted reaction mass, with the incidental increase in expense.

It is an object of my invention to provide a process for isomerizing the $\psi$-ionones, which is characterized by simplicity, cheapness, and high overall efficiency. It is a further object of my invention to provide a process for isomerizing $\psi$-ionones which has the further advantage of yielding a product consisting predominantly of the $\alpha$-isomer. Other important objects of this invention will appear as the description proceeds.

I accomplish the objects of my invention by using for isomerization aqueous formic acid of a strength less than 80%, and more particularly, of a strength between 55 and 80% formic acid. I have found that not only is isomerization possible with formic acid of this strength, but that the yield and constitution of the product do not differ materially from those obtained by the use of concentrated formic acid, that is formic acid of 90% strength or over. This effect is rather surprising, for it appears to have been generally believed in the art that to be operative for isomerization, formic acid must be concentrated.

The use of relatively weak formic acid within the range indicated above has the immediate advantage that the isomerized product separates directly from the reaction mass without further dilution. Consequently, after removing the oily layer the acid layer is adapted to be used directly for the isomerization of a subsequent batch, without intermediate concentration or rectification procedures. The entire process thus becomes simplified to its lowest terms, and may be briefly outlined as follows:

The $\psi$-ionone compound, that is $\psi$-ionone or $\psi$-methyl-ionone, directly as obtained from the reaction of citral with the corresponding lower ketone, or, if desired, after intermediate purification, is dissolved in aqueous formic acid of between 55 and 80% strength, and heated under reflux until the isomerized product has separated as a brown oil floating on top of the acid. The mixture is then cooled and allowed to settle. The oily layer is withdrawn, washed, and used directly or subjected to further purification by vacuum distillation. The acid layer on the other hand is saved without further treatment, and is ready for use directly in the isomerization of a subsequent batch.

In the case of methyl-ionone, the isomerization mass may be treated further to separate the $a$-isomer from the $b$-isomer. One convenient method, especially adapted to this invention is as follows: The isomerization mass is allowed to settle without substantial cooling and the oily layer is withdrawn; the acid layer is then allowed to cool and settle again, whereby a further portion of the organic product separates. In this manner a fractionation is effected between the $a$-isomer and the $b$-isomer, which may be of assistance in the further separation of the two isomers. This feature is more particularly described and claimed in my co-pending application of even date, Serial No. 39,443.

Without limiting my invention to any particu-

Example 1

800 parts of commercial concentrated formic acid (90%) are diluted with 200 parts of water, and heated to a temperature of 95 to 100° C. in a vessel provided with a reflux condenser and means for agitation. 150 parts of ψ-methyl-ionone are now introduced. The temperature of the solution so obtained is now raised to reflux (about 106° C.) and maintained at this point for about thirty minutes, or until the reaction product, which separates as a brown oil, does not perceptibly increase any more. The mixture is cooled to room temperature and allowed to separate. After withdrawing the acid, the oil is washed repeatedly with water and a small amount of soda ash, until it is free from formic acid. There are obtained 135 parts of crude methyl ionone, which may be further purified by distillation under vacuum. The methyl ionone consists of the same isomers as obtained with concentrated formic acid; that is, it is essentially α-methyl-ionone.

Example 2

The process is the same as in Example 1, but in lieu of a fresh diluted mixture of formic acid and water, the recovered formic acid of Example 1 is employed. The results are the same as in Example 1, but the yield is practically theoretical, due to the fact that the formic acid is already saturated with the reaction product from the previous batch.

Example 3

1000 parts of formic acid solution (70% by weight) are heated to 100° C. 200 parts of pseudo-ionone are introduced under agitation and the mixture is heated to a gentle reflux (105° C.) and maintained at this temperature for three-quarters of an hour. After cooling, the reaction product is separated and worked up as in Example 1. There is obtained about 180 parts of crude ionone. By repeating the isomerization with the recovered formic acid and fresh pseudo-ionone, the yield of crude ionone is 96 to 98%.

Example 4

A mixture of 200 parts of ψ-methyl-ionone and 1000 parts of 76% formic acid solution is heated under reflux, until further formation of the oily reaction product is no longer observed. The mass is now cooled to 80° C. and maintained at this temperature without agitation until it has settled into layers. The oily layer, which corresponds in weight to about 135 parts is removed, and is subjected to fractionation from 86% formic acid according to the process described more fully in my co-pending application, Serial No. 39,443. It consists essentially of α-methyl-ionone b and α-methyl-ionone a in the ratio 7:3.

The acid layer from the first separation above mentioned is now cooled to room temperature, and the new oily layer of a weight corresponding to some 40 parts is recovered. It consists predominantly of α-methyl-ionone a. The formic acid layer from this operation may be used directly for treating in a similar manner a subsequent batch of ψ-methyl-ionone, with resultant increased yields throughout.

It will be understood that the details of procedure and the quantities involved may vary considerably from the preferred embodiments given above, without departing from the spirit of this invention.

Thus, the quantity of formic acid employed as compared to the weight of the pseudo compound being treated may vary within wide limits. Excessive quantities of formic acid make little difference in the economy of the process, in view of the fact that its is reused.

The concentration of the formic acid may vary within the limits indicated. At lower concentrations, the speed of reaction is too slow. Hence, it is not economical to operate too close near the lower limit. The optimum range of concentration is between 70 and 80%.

The reaction temperature is preferably the boiling point of the aqueous formic acid at atmospheric pressure, but it may be considerably lower, for instance any temperature above 60° C., except that a decrease in temperature involves an increase in reaction time.

The time of reaction varies with the concentration and temperature at which the reaction is carried out. The best practice is to continue the heating until the quantity of oily reaction product which separates no longer increases.

In lieu of operating on the isolated pseudo compound, one may apply this invention directly to the reaction mass of acetone or methyl-ethyl-ketone upon pure citral or oil of lemon-grass.

It will now be apparent that my invention constitutes an important improvement in the practical manufacture of ionones. The process is simplified; waste of materials is eliminated; and the cost of operation is reduced to a minimum. Furthermore, my process leads to a product consisting almost exclusively of the valuable α-isomer. Then again, my novel mode of operation facilitates the separation of the a- and b-constituents of the α-isomer when applied to the manufacture of methyl-ionone. Finally, the isomerization becomes susceptible of careful control and regulation, due to the great latitude of variations in the optimum conditions and due to the moderate speed of the reaction as contrasted, for instance, with the fast working, concentrated-formic-acid method.

In the claims below, the terms "an ionone" or "an ionone compound" are meant as generic terms to include ionone itself and methyl-ionone in all their isomeric forms. The symbol "ψ" stands for the word pseudo.

I claim:

1. In the process of manufacturing an ionone, the step which comprises reacting upon a pseudo-ionone with formic acid of a strength between 55 and 80%.

2. In the process of manufacturing an ionone, the step which comprises heating a pseudo-ionone with formic acid of a strength between 55 and 80%, and separating the formed ionone.

3. A process for the manufacture of an ionone, which comprises heating a ψ-ionone with aqueous formic acid of a concentration between 55 and 80% H.COOH, at reflux temperature.

4. A process for the manufacture of an ionone, which comprises dissolving a ψ-ionone in hot aqueous formic acid of a concentration between 55 and 80% H.COOH, heating the mixture at reflux temperature until an oily reaction product is formed, cooling the reaction mass and recovering the oily reaction product.

5. A process for the manufacture of an ionone, which comprises heating a ψ-ionone with aqueous formic acid of a concentration between 55 and 80% H.COOH, at reflux temperature, cooling the reaction mass, separating the oily phase from the aqueous-acid phase, mixing the latter with a further quantity of a ψ-ionone, and repeating the cycle.

6. A process for the manufacture of an ionone, which comprises heating a ψ-ionone with a mass of aqueous formic acid of 70 to 80% strength which had been recovered from a previous manufacture of an ionone, cooling the reaction mass, and separating the oily phase from the aqueous acid phase.

7. A process as in claim 6 applied to the manufacture of ionone from ψ-ionone.

8. A process as in claim 6 applied to the manufacture of methyl-ionone from ψ-methyl-ionone.

9. A process for the manufacture of methyl-ionone, which comprises heating ψ-methyl-ionone with aqueous formic acid of 70 to 80% strength at a temperature above 80° C., cooling successively to a plurality of different degrees of temperature, and recovering the oily phase which separates at each temperature.

10. A process for the manufacture of methyl-ionone, which comprises heating ψ-methyl-ionone with aqueous formic acid of 70 to 80% strength at a temperature above 80° C., cooling to about 80° C. and recovering the oily layer which separates at this temperature.

11. A process for the manufacture of methyl-ionone, which comprises heating ψ-methyl-ionone with aqueous formic acid of 70 to 80% strength at a temperature above 80° C., cooling the reaction mass to about 80° C., separating the oily phase which forms at this temperature, cooling the residual mass further to about room temperature and separating the new oily phase.

WALTER CHRISTIAN MEULY.